Dec. 12, 1939.  W. J. MORRILL  2,183,404
HYSTERESIS TORQUE MOTOR
Filed July 13, 1937
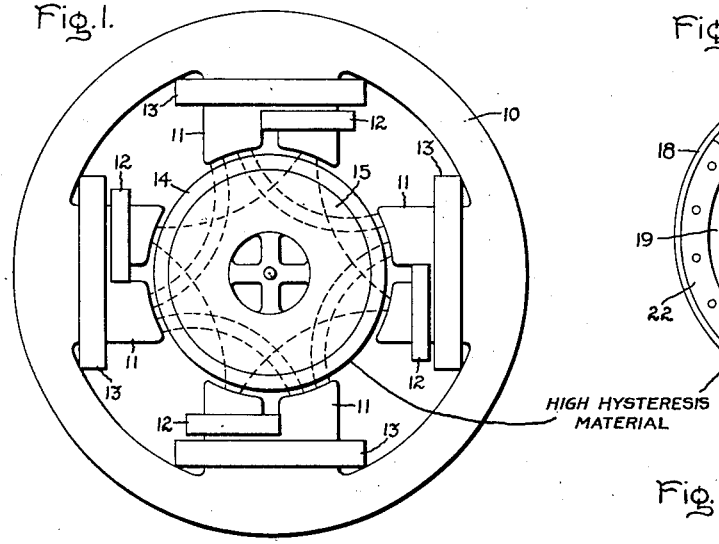
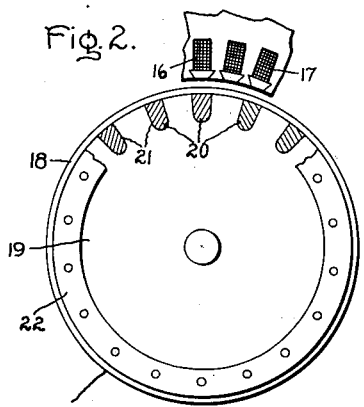
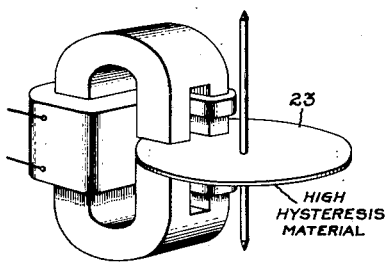
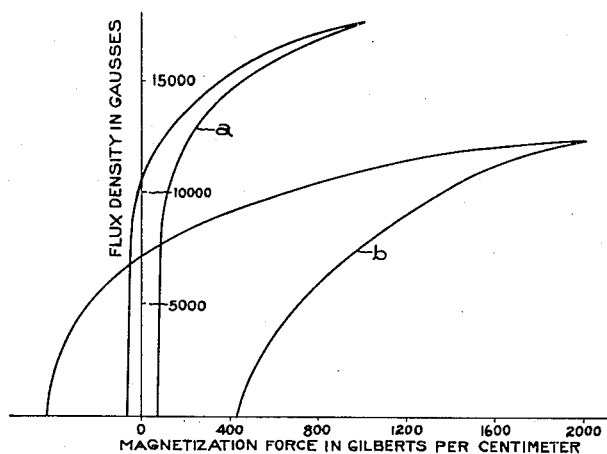
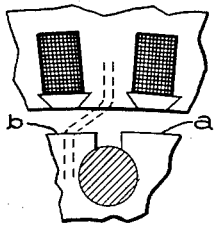
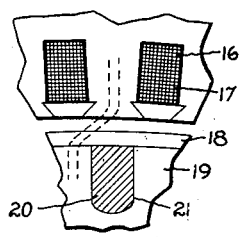
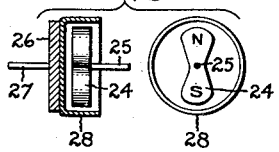
Inventor:
Wayne J. Morrill,
by Harry E. Dunham
His Attorney.

Patented Dec. 12, 1939

2,183,404

UNITED STATES PATENT OFFICE 2,183,404

HYSTERESIS TORQUE MOTOR

Wayne J. Morrill, Fort Wayne, Ind., assignor to General Electric Company, a corporation of New York Application July 13, 1937, Serial No. 153,356

10 Claims. (Cl. 172—120)

My invention relates to hysteresis torque devices and in particular to motors operating partially or wholly on the hysteresis principle.

It is one object of my invention to improve the hysteresis torque of such motors by the use of materials having a much higher hysteresis loss than has heretofore been employed in the conventional hysteresis motor.

In hysteresis motors of the prior art, such, for example, as are represented in Warren Patent No. 1,546,269, July 14, 1925, the rotor is made of hysteresis material, and it will be noted that the flux passes between stator poles through the rotor hysteresis material generally in a peripheral direction. In order to obtain maximum hysteresis torque for a given material in such a rotor, it is desirable that the material be operated at a high flux density and in the rotors of such motors above referred to the central portion of the rotor is largely cut away to increase the flux density about the periphery. Now, in order to force a desirable magnitude of flux through the relatively long path of rotor hysteresis material in such motors as referred to above, it is, of course, necessary to use a steel that can be magnetized relatively easily. In general, it may be stated that the steels which are easy to magnetize are not those which give the highest hysteresis loss. It is the purpose of my invention to provide motor constructions that will make feasible the use of the high hysteresis loss, difficult to magnetize steels and to thus obtain hysteresis motors having improved torque. The invention may also be used to advantage in combination with rotors having windings in slots to reduce slot opening noises.

The features of my invention which are believed to be novel and patentable will be pointed out in the claims appended hereto. For a better understanding of my invention, reference is made in the following description to the accompanying drawing in which Fig. 1 represents a side view of a hysteresis motor embodying my invention; Fig. 2 represents a combined hysteresis and squirrel cage induction motor embodying my invention; Fig. 3 represents a motor employing a disk armature of hysteresis material; Fig. 4 shows the hysteresis loop of tungsten steel and of an alloy made of iron, nickel, and aluminum; Fig. 5 illustrates an open-slot rotor construction of the prior art; Fig. 6 illustrates, by way of comparison, certain improvements therein that can be obtained by employing the present invention, and Fig. 7 illustrates a simple hysteresis torque coupling embodying the broad principle of my invention.

Referring to Fig. 1, I have here represented a four-pole motor of the shaded-pole type provided with a hysteresis rotor embodying my invention. The stator is of a usual construction and comprises the laminated magnetic stator frame 10 having inwardly projecting split poles 11 with shading bands 12 on the trailing portions of the split-pole pieces. A single-phase winding, comprising coils 13 wound on the pole pieces, is connected to produce alternate north and south flux poles at the four pole pieces, which flux field passes through the rotor as generally indicated by the dotted lines. A four-pole alternating-current field, which has a shifting or rotating component, is thus produced.

The rotor includes an outer sheet or shell 14 of high hysteresis material, a material which is relatively difficult to magnetize but which has high coercive force, for example, above 400 gilberts per centimeter. The heat-treated alloy described in United States Patent No. 1,947,274, February 13, 1934, to Ruder, composed of from ten per cent to twelve per cent aluminum, twenty per cent nickel, and the remainder iron, is suitable for the shell 14. Also I may use the alloy of United States Patent No. 1,968,569, July 13, 1934, to Ruder. Where I refer to coercive force in gilberts per centimeter in the description and claims, I mean that magnetizing force necessary to reduce the residual flux remaining in the material to zero after the material has been magnetized to saturation. I do not wish to limit my invention to any particular hysteresis material in the shell, and the materials mentioned are given by way of example. In general, permanent magnet materials which have the highest hysteresis loss are the most difficult to magnetize and the radial thickness of the shell 14 will depend somewhat on the relation of these characteristics in the material used. The outer cylindrical shell 14 is mounted on an inner cylindrical magnetic core part 15 of relatively good magnetic conductivity and which serves primarily for conducting the rotor flux in a peripheral direction between the pole pieces. The core 15 may be of a material that has some hysteresis loss and, to the extent that it has a hysteresis loss, it is an advantage, provided fair magnetic conductivity is not sacrificed to the extent that the core fails to provide a path between the pole pieces which the flux will follow.

The question of whether the rotor core material 15 should be laminated or unlaminated will be governed by the usual considerations. If a material having relatively low resistance is used and the motor is primarily intended to operate at or close to synchronism, in which case eddy currents in the rotor are generally undesirable, it will be desirable to laminate the rotor core 15. If the motor is primarily intended for starting duty or high-slip operation, eddy currents will contribute useful torque provided they do not choke the flux through the rotor, in which case, the core 15 may be unlaminated. In small motors, the core material may extend to the shaft and in larger motors it may be desirable to save core material by mounting the same on a spider as indicated in Fig. 1. Where it is feasible to use a rotor core material, such as tungsten steel, for example, that has appreciable hysteresis loss but is of sufficiently good flux conductivity to draw the flux through the outer shell and conduct it between the pole pieces, it will be desirable to use a spider, preferably of non-magnetic material, so as to raise the flux density in core 15 to take advantage of the maximum possible hysteresis loss therein as in previous hysteresis rotors which were not provided with the outer shell 14.

In previous hysteresis motors, a relatively large air gap was usually found to be desirable. In my motor the outer shell 14 can, to a certain extent, replace the large air gap of previous hysteresis motors and the actual air gap may be reduced to advantage. Thus if the core 15 be considered as the normal hysteresis rotor of the prior art, I still have the desirable large gap as far as core 15 is concerned, which gap is partially occupied by the shell 14 between core 15 and the stator pole pieces. Also, I obtain the advantage of the high hysteresis torque contributed by the high hysteresis material of shell 14 and a lower reluctance gap than if shell 14 were replaced by an air space. The primary purpose of core 15, however, is to provide a satisfactory flux path between the pole pieces and where shell 14 is made sufficiently thick to prevent satisfactory penetration of the flux to core 15 if the latter be made of a material having relatively poor flux conductivity in order to obtain higher hysteresis loss, then it would be preferable to use a better flux conductivity material for core 15, such, for example, as silicon steel, to thereby raise the flux density through the high hysteresis material in shell 14.

Whatever combination of materials and proportions will contribute the greatest combined hysteresis torque with an efficient utilization of the flux produced by the stator, they should be used and the proportions will necessarily vary with materials having different magnetic properties and to some extent with the motor characteristics desired. In general it may be stated that the length of the rotor flux path in the high hysteresis material is relatively short as compared to the cross-sectional area of such flux path through such material in order to pass a high percentage of the rotor flux therethrough.

In order to illustrate the nature of the magnetic properties of different materials that may be used in the combination, reference is made to the hysteresis curves of Fig. 4 showing the upper halves of characteristic hysteresis loops of tungsten steel (curve $a$) and of the alloy of Ruder Patent No. 1,947,274 (curve $b$) plotted to the same scale. The ordinates represent gausses or flux density and the abscissa represent gilberts per centimeter or magnetizing force. The magnetization of the tungsten steel to produce curve $a$ was carried to one thousand gilberts and the flux density reached seventeen thousand six hundred and fifty gausses. The magnetization of the alloy material was carried to two thousand gilberts to produce curve $b$ and the flux density reached only twelve thousand two hundred and fifty gausses. It is seen from these curves that tungsten steel is much more easily magnetized than the alloy. At one thousand gilberts, the average flux density of the alloy is roughly half that of tungsten steel. It is easy to see, however, that the alloy will produce a very much greater hysteresis loss even for the same degree of magnetization.

Let us assume that in Fig. 1 the outer shell 14 is made of the alloy having the characteristics of curve $b$, Fig. 4, and that the core 15 is made of tungsten steel having the characteristics of curve $a$, Fig. 4. If the rotor of Fig. 1 were made entirely of the alloy, the flux density between the pole pieces through the rotor material for a given magnetizing force would be very materially reduced. The advantage of using the higher hysteresis material for the entire rotor flux path would be more than offset by a reduction in rotor flux. On the other hand, if the rotor material were made entirely of tungsten steel, the flux density through the rotor would be only slightly increased because the greater length of the flux path already comprises tungsten steel and the hysteresis loss would be reduced. By thus combining the high hysteresis material 14 in the short radial rotor flux path and a satisfactory flux conducting material 15 in the long peripheral rotor flux path, I am able to obtain a relatively high rotor flux density in both materials and the advantage of the high hysteresis loss and hence hysteresis torque contributed by the outer shell material and such hysteresis loss and torque as is produced in the lower hysteresis material 15. As a matter of fact, the tungsten steel part 15 alone should produce as much hysteresis torque as would a tungsten steel hysteresis rotor in the large air gap hysteresis motor of the prior art. The presence of the outer shell 14 does not decrease the rotor flux because it has a much better resultant magnetic conductivity than the same amount of air gap at the high flux densities that should be used. The actual air gap in my motor is preferably made as small as mechanical and other considerations will permit. Instead of attempting to obtain any material hysteresis torque from the core material 15, it may be found equally desirable to increase the flux density through the outer shell 14 by employing the best possible magnetic-conducting material, such as iron in the rotor core 15.

Such a hysteresis motor as I have described can obviously be designed as a synchronous motor in accordance with the magnetic-remanence principle employed in the Warren patent previously mentioned since the outer shell material used by me readily becomes more or less permanently magnetized with north and south poles about its periphery as synchronous speed is approached.

In Fig. 2 I have shown another embodiment of my invention wherein the rotor includes a squirrel cage winding. In this modification the stator has a distributed primary winding 16 in slots 17. The primary winding may be of the split-phase or conventional polyphase type. The rotor comprises the outer shell 18 of high hysteresis magnetic material, such as the alloy having the characteristics shown in curve $b$ of Fig. 4 but made somewhat thinner than in the embodiment of Fig. 1, an inner rotor core 19 of good magnetic-conducting material, such as silicon steel, employed to conduct the rotor flux between the magnetic poles of the stator, and a squirrel cage winding having bars 20 in slots 21 of core 19 and end rings 22. The shell 18 contributes hysteresis torque just as in Fig. 1 but has additional advantages both mechanical and magnetic. It provides a means for securely holding the squirrel cage bars in their slots against the action of centrifugal force and permits the use of wide open slots 21 in core 19. This form of slot is a little less difficult to punch than a partially-closed or completely-closed slot and the bars 20 are more easily placed or cast therein. The structure, however, gives substantially the full advantage of a closed-slot construction with respect to the elimination of slot noises and does not have the disadvantage of short-circuiting stator flux that should penetrate the squirrel cage.

In an open or partially open slot construction, such as is represented in Fig. 5, the flux that passes from stator to rotor may be considered as bunched opposite the stator teeth. Then when the motor is in operation these flux bunches may be considered to jump across the rotor slot openings between positions a and b and this gives rise to what is known as slot noises. To eliminate such noises, closed slots are sometimes employed. However, the closing of the slots with good magnetic-conducting material forms an outer magnetic ring about the rotor which prevents a small portion of the stator flux from cutting the squirrel cage and hence such portion produces no useful result. By providing the shell 18 of high hysteresis but relatively poor magnetic-conducting material about an open-slot rotor, as shown in Fig. 2 and more in detail in Fig. 6, the jumping of the flux across the rotor core slot opening is cushioned by the hysteresis loss occasioned by such shift of flux in the shell 18 and, moreover, the jumping effect is not so pronounced because the material of the shell is a better magnetic flux conductor than air. Slot noises are thus substantially eliminated, substantially useful hysteresis torque is produced, and none of the flux between different magnetic poles is shunted by such shell. The latter is because of the high reluctance of the shell material as compared with the material of the rotor core 19. The hysteresis torque and the induction motor torque produced by the squirrel cage add to produce a high combined motor torque. The shell may be cast in place on the rotor or it may be cast separately and then secured on the core 19 by shrink-fitting or otherwise. If the squirrel cage is cast, this operation can to advantage be done after the shell is in place. The shell will thus serve as a part of the mold and a solid construction will result.

Fig. 3 represents a shaded-pole disk motor, the rotor disk 23 of which is made of a high hysteresis loss material, such as the alloy previously referred to. The relatively narrow air gap of the disk type of motor permits good flux density between the pole pieces on opposite sides of the disk, and the construction prevents the flux from undue spreading in the disk, whereby good hysteresis torque is obtained. As in Fig. 2, the disk motor of Fig. 3 may include an induction motor secondary, if that is desired. This may be accomplished, for example, by a heavy copper plating on the hysteresis disk.

In Fig. 7 I have shown a very simple hysteresis torque device. A magnetic field producing member 24 comprising a bar permanent magnet is mounted for rotation with the shaft 25. A core part 26 which may be a simple iron disc is separately mounted for rotation with shaft 27. This core is positioned so as to provide a relatively good path for the flux of the magnet 24. Secured to the core part 26 and interposed between it and magnet 24 is a thin cup-shaped section 28 of high coercive force magnetic material. The core 26 promotes a high flow of flux through the hysteresis material 28 and the latter thus produces good hysteresis torque when there is relative rotation between it and the field produced by the bar magnet.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A hysteresis motor comprising a primary member provided with means for producing an alternating flux field having a rotating component and a relatively rotatable secondary within the influence of said field, said secondary comprising, an outer shell of high hysteresis magnetic material and an inner core of relatively low hysteresis magnetic material of sufficient permeability to cause a major portion of the rotor flux to pass therethrough.

2. A hysteresis motor comprising a primary member provided with means for producing an alternating flux field having a rotating component and a relatively rotatable secondary within the influence of said field, said secondary including a high hysteresis, difficult to magnetize magnetic material having a coercive force of at least four hundred gilberts per centimeter, said material being in relatively thin sheet form and supported with its lateral dimension substantially crosswise to and in the path of the flux through the secondary so as to make the distance through such material in the linear path of the rotor flux relatively short as compared to the cross-sectional area of said material in the path of the flux for the purpose of causing a high percentage of the field produced by the primary to cut said material.

3. A multipolar hysteresis motor comprising a primary stator member provided with means for producing a multipolar alternating flux field having a rotating component, and a rotor secondary disposed in the path of the flux of such field, said secondary comprising an outer cylindrical shell of high hysteresis magnetic material and an inner cylindrical core of a lower hysteresis magnetic material, the directions of the flux paths through the rotor being substantially radial through the outer shell and substantially peripheral through the inner core, the latter portions of such flux paths being long as compared to the radial portions thereof.

4. A hysteresis motor rotor comprising an outer shell of a high hysteresis magnetic material and an inner core of a lower hysteresis magnetic material of good magnetic conductivity, said parts comprising concentric hollow cylinders closely fitting each other, the radial thickness of the outer shell being small as compared to the radial thickness of the inner cylinder.

5. A combined hysteresis and induction motor rotor comprising an inner magnetic core part having an open slot squirrel cage winding in its periphery, and a thin cylindrical shell of high hysteresis magnetic material closely fitted and surrounding the periphery of said core and closing the slots of said squirrel cage.

6. A hysteresis motor comprising a magnetic stator provided with pole pieces separated by a narrow air gap, means on said stator for producing an alternating field having a rotating component between said pole pieces across said gap, and a rotor comprising a disk of hysteresis magnetic material having a coercive force of at least four hundred gilberts per centimeter rotatively mounted in said air gap.

7. A combined hysteresis and induction motor comprising a primary member for producing a rotating magnetic field, and a relatively rotatable secondary separated from said primary by a narrow air gap and subjected to the influence of said field, said secondary comprising a core part of good magnetic conducting material having an open slot induction motor winding thereon and having a thin facing of a high coercive force magnetic material closing the slots of said core and defining the secondary side of said motor air gap.

8. A hysteresis motor comprising a primary member, alternating-current winding means on said primary for producing a rotating magnetic field having spaced apart alternate north and south poles, a relatively rotatable secondary cooperating with said field comprising a low hysteresis, high permeability magnetic core providing a path for the primary flux between the north and south poles thereof, and a relatively thin section of a high coercive force low permeability, hysteresis material secured to said core and separating said core from said primary member.

9. An alternating-current motor comprising relatively rotatable primary and secondary members, said primary member having an open slot core structure and a distributed winding in the slots for producing a rotating magnetic field, the secondary comprising a magnetic core member provided with open slots, a secondary winding in said slots, and a relatively thin section of a high coercive force hysteresis material separating said core from the slotted surface of the primary core and forming a high reluctance closure for the open slots of the secondary.

10. A synchronous hysteresis motor comprising a primary member for producing an alternating field having a rotating component, a relatively rotatable secondary member having a non-polarized magnetic core member of high magnetic permeability in the path of the field produced by the primary member, and a shell of high coercive force, low permeability hysteresis material secured to said secondary core and interposed in the flux path between said primary and said secondary core members.

WAYNE J. MORRILL.